(12) United States Patent
Andgart et al.

(10) Patent No.: US 8,837,642 B2
(45) Date of Patent: Sep. 16, 2014

(54) METHODS AND DEVICES FOR ESTIMATING CHANNEL QUALITY

(71) Applicant: Telefonaktiebolaget L M Ericsson (publ), Stockholm (SE)

(72) Inventors: Niklas Andgart, Södra Sandby (SE); Matthias Kamuf, München (DE); Fredrik Nordström, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/848,221

(22) Filed: Mar. 21, 2013

(65) Prior Publication Data

US 2013/0279634 A1 Oct. 24, 2013

Related U.S. Application Data

(60) Provisional application No. 61/616,626, filed on Mar. 28, 2012.

(30) Foreign Application Priority Data

Mar. 21, 2012 (EP) .................................... 12160570

(51) Int. Cl.

| | | |
|---|---|---|
| *H04L 27/06* | (2006.01) | |
| *H03K 9/00* | (2006.01) | |
| *H04B 7/04* | (2006.01) | |
| *H04B 7/08* | (2006.01) | |
| *H04L 25/06* | (2006.01) | |
| *H04L 25/02* | (2006.01) | |
| *H04L 25/03* | (2006.01) | |
| *H04L 1/20* | (2006.01) | |
| *H04L 5/00* | (2006.01) | |
| *H04L 1/06* | (2006.01) | |

(52) U.S. Cl.
CPC .......... *H04L 25/0256* (2013.01); *H04B 7/0413* (2013.01); *H04B 7/086* (2013.01); *H04L 25/067* (2013.01); *H04L 25/03318* (2013.01); *H04L 25/0224* (2013.01); *H04L 1/06* (2013.01); *H04L 25/03331* (2013.01); *H04L 1/206* (2013.01); *H04L 5/0023* (2013.01); *H04B 7/0854* (2013.01); *H04L 25/03891* (2013.01)
USPC .......................................... 375/340; 375/316

(58) Field of Classification Search
USPC ................................................... 375/340, 316
See application file for complete search history.

(56) References Cited

U.S. PATENT DOCUMENTS

| | | | |
|---|---|---|---|
| 2003/0072395 A1* | 4/2003 | Jia et al. .................... | 375/341 |
| 2005/0190868 A1 | 9/2005 | Khandekar et al. | |

(Continued)

FOREIGN PATENT DOCUMENTS

| | | | |
|---|---|---|---|
| WO | 2010072451 A1 | 7/2010 | |
| WO | WO 2010119044 A1 * | 10/2010 | |
| WO | 2010141911 A2 | 12/2010 | |

*Primary Examiner* — Chieh M Fan
*Assistant Examiner* — Brian J Stevens
(74) *Attorney, Agent, or Firm* — Coats & Bennett, P.L.L.C.

(57) ABSTRACT

The invention relates to a method performed in a user equipment for estimating channel quality. The user equipment is adapted to operate in a multiple input multiple output (MIMO) mode in a communication system comprising a base station node supporting MIMO and serving the user equipment. The method comprises: receiving, from the base station node, a reference signal; performing joint demodulation of the reference signal, thereby obtaining soft values; and generating the channel quality using the soft values. The invention also relates to a user equipment, computer programs and computer program products.

10 Claims, 4 Drawing Sheets

(56) References Cited

U.S. PATENT DOCUMENTS

2007/0234178 A1* 10/2007 Richardson et al. .......... 714/758
2011/0002421 A1* 1/2011 Murakami et al. ............ 375/341
2012/0170627 A1* 7/2012 Koike et al. ................... 375/219

* cited by examiner

METHODS AND DEVICES FOR ESTIMATING CHANNEL QUALITY

This application claims priority to European Patent Application No. 12160570.3, filed on Mar. 21, 2012 and U.S. Provisional Patent Application No. 61/616,626, filed on Mar. 28, 2012, the contents of which are hereby incorporated herein by reference.

TECHNICAL FIELD

The technology disclosed herein relates generally to the field of wireless communication systems, and in particular to channel quality estimations in user equipment within such wireless communication systems.

BACKGROUND

In wireless communication systems, there is a constant strive for improvement of transmission technologies in order to utilize the available spectrum in most efficient way.

Multiple-input Multiple-Output (MIMO) technology is one such effort to improve communication performance. In MIMO, use is made of multiple antennas at both the transmitter and receiver, thereby enabling increased data throughput and coverage without additional spectrum or increased transmission power. The transmitter thus sends multiple streams by multiple transmit antennas and the transmitted streams are received by the multiple antennas of the receiver.

The receiver may decode the streams by using a linear demodulation method, such as minimum mean square error (MMSE) estimation. However, with access to more computational power more advanced receiver structures can be used in order to improve the transmission speed and/or noise robustness of the wireless MIMO receivers. For example, a non-linear demodulation method may be used, such as Joint Demodulation (JD), also denoted Maximum Likelihood (ML) detection, which selects the most probable combinations of transmitted signals.

To fully take advantage of the increased performance of such non-linear demodulation, proper link adaptation methods are required. Otherwise a sub-optimal choice of modulation and coding may be done, leading to lower performance than the ML-detector is actually capable of. In the 3GPP Long Term Evolution (LTE), link adaptation is based on measured instantaneous Signal to Interference and Noise Ratio (SINR). The SINR is used for selecting modulation and coding scheme (MCS) for transmissions.

For the linear MMSE receiver, there exists well-known expressions for the SINR estimation, but for a non-linear joint demodulation it is not as straight-forward to calculate the SINR estimate. One known way is to add a certain offset to the MMSE-based estimate, which will slightly increase the performance.

Another suggested way is to use soft values at the output of the ML detector in order to estimate the channel quality.

SUMMARY

Using the soft values from the decoder output will represent the quality of the scheduled data, but this entails a disadvantage of only evaluating one modulation format, one precoder, and also only those resource blocks that the user equipment is scheduled in. In e.g. LTE conforming communication systems, wherein the user equipment is supposed to measure and report quality over the whole frequency band, even in resource blocks that it is not scheduled in, this is a big disadvantage.

There is thus a need for methods and devices for improved non-linear joint demodulation.

An object of the invention is to overcome or at least alleviate one or more of the above mentioned problems.

The object is, according to a first aspect of the invention, achieved by a method performed in a user equipment for estimating channel quality. The user equipment is adapted to operate in a multiple input multiple output (MIMO) mode in a communication system comprising a base station node supporting MIMO and serving the user equipment. The method comprises receiving, from the base station node, a reference signal; performing joint demodulation of the reference signal, thereby obtaining soft values; and generating the channel quality using the soft values.

The invention efficiently overcomes the difficulty of calculating a channel quality estimate, such as signal to interference and noise ratio, for non-linear joint demodulation by using the quality of the soft values. The soft value quality may then reflect the performance of the demodulation that is used in practice. By means of the method, the channel quality measure may be transmitted to and used at a MIMO transmitter in order to maximize the rate at which data is transmitted to and successfully received at the MIMO receiver.

By decoding reference signals, such as pilot signals, soft values and thus quality of other resource blocks than the ones the user equipment are scheduled in are obtained.

In an embodiment, the performing of joint demodulation of the reference signal comprises using a precoder matrix W.

In an embodiment, the method comprises, before the joint demodulation, obtaining a virtual precoded reference, giving possible constellation points.

In a variation of the above embodiment, the obtaining of a virtual precoded reference signal is performed by derotating a precoder matrix.

In an embodiment, the method comprises transforming the possible constellation points for adaptation to a used modulation scheme such that the possible constellation points match the corresponding modulation scheme.

In an embodiment, the generating of the channel quality comprises converting the soft values to capacity information, the capacity information providing a measure on the channel quality.

In an embodiment, the soft values are used for calculating a bit error probability.

In one embodiment, the bit error probability is calculated by $$P_b = \frac{1}{(1 + e^{|\lambda|})},$$

wherein $\lambda$ is soft value.

In one embodiment, the capacity information C is calculated for a Binary Symmetric Channel (BSC) by:

$$C = 1 + P_b \log_2 P_b + (1 - P_b) \log_2 (1 - P_b)$$

In a variation of the above embodiment, the method comprises obtaining for all bits corresponding to a soft value, an individual capacity information, and summing the individual capacity information, giving an estimate of the channel capacity.

In an embodiment, the method comprises, following the receiving of a reference signal, determining a rank and performing, for rank equaling 2 or higher, joint demodulation of the reference signal, thereby obtaining soft values, and generating the channel quality using the soft values; and performing, for a rank equaling 1, estimation for generating the channel quality using a minimum mean square error, MMSE, receiver.

The object is, according to a second aspect of the invention, achieved by user equipment for estimating channel quality. The user equipment is adapted to operate in a multiple input multiple output (MIMO) mode in a communication system comprising a base station node supporting MIMO and serving the user equipment. The user equipment is configured to receive, from the base station node, a reference signal; perform joint demodulation of the reference signal, thereby obtaining soft values; and generate the channel quality using the soft values.

In an embodiment, the user equipment is configured to perform joint demodulation of the reference signal by using a precoder matrix W.

In an embodiment, the user equipment configured to, before the joint demodulation, obtain a virtual precoded reference signal by derotating a precoder matrix, giving possible constellation points.

In a variation of the above embodiment, the user equipment may be configured to further transform the possible constellation points for adaptation to a used modulation scheme such that the possible constellation points match the corresponding modulation scheme.

In an embodiment, the user equipment is configured to generate the channel quality by converting the soft values to capacity information, the capacity information providing a measure on the channel quality.

In an embodiment, the user equipment is configured to use the soft values for calculating a bit error probability.

The object is, according to a third aspect of the invention, achieved by computer program for a user equipment for estimating channel quality. The user equipment is adapted to operate in a multiple input multiple output (MIMO) mode in a communication system comprising a base station node supporting MIMO and serving the user equipment. The computer program comprises computer program code which, when run on the user equipment, causes the user equipment to perform the steps of receiving, from the base station node, a reference signal; performing joint demodulation of the reference signal, thereby obtaining soft values; and generating the channel quality using the soft values.

The object is, according to a fourth aspect of the invention, achieved by computer program product comprising a computer program as above and a computer readable means on which the computer program is stored.

Further features and advantages of the invention will become clear upon reading the following description and the accompanying drawings.

DETAILED DESCRIPTION

Figure 1:
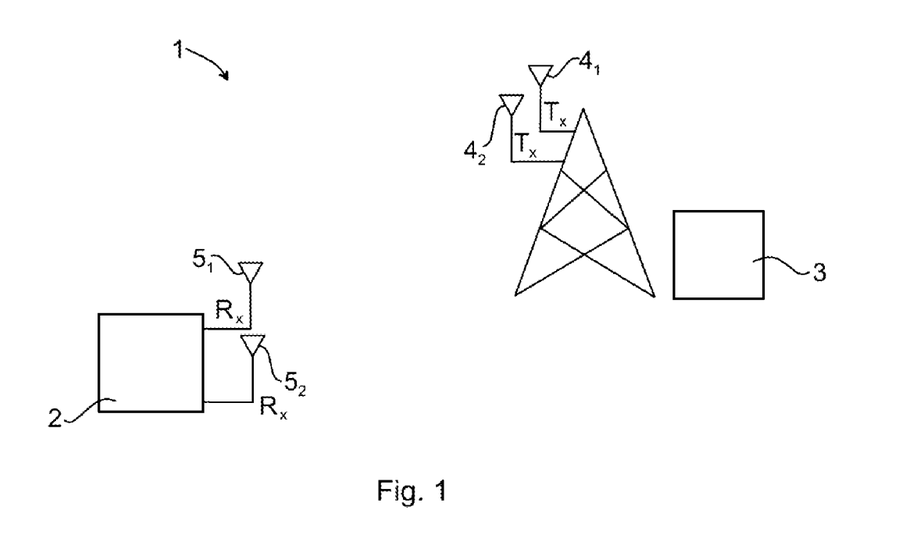
FIG. 1 illustrates schematically an environment in which embodiments of the invention may be implemented.

FIG. 1 illustrates schematically an environment in which embodiments of the invention may be implemented. In particular, a communication system 1 comprises one or more multiple input multiple output (MIMO) enabled user equipment 2 and one or more base station nodes 3 supporting the use of MIMO. The base station node 3 serves the user equipment 2 and comprises a number of transmit/receive antennas. Although only two antennas $4_1$, $4_2$ are illustrated in the figure, it is realized that the base station node 3 may comprise any number of antennas. The user equipment 2 is illustrated as comprising two antennas $5_1$, $5_2$, but again, any number of antennas is conceivable.

A 2×2 MIMO configuration is thus shown in FIG. 1, wherein the base station node 3, in the following also denoted transmitter, comprises two separate transmit antennas $4_1$, $4_2$ and the user equipment 2, in the following also denoted receiver, comprises two receive antennas $5_1$, $5_2$.

It is noted that although the invention will be described with respect to such 2×2 MIMO configuration, the principles are applicable to higher-order MIMO as well. Numerous other MIMO configurations using combinations of multiple antenna pairs, such as e.g. 3×3 and 4×4 are also possible. The MIMO system could even be configured with an unequal number of antennas at the transmitter and the receiver, e.g. m×n, wherein the number m of transmit antennas is not equal to the number n of receive antennas.

Further, it is also noted that embodiments of the invention are described and exemplified as applied in a communication system 1 conforming to the LTE standard. However, the various embodiments are applicable to other communication systems implementing Orthogonal Frequency Division Multiplexing (OFDM) or other radio access technologies using MIMO transmissions.

Briefly, a main aspect and idea of the invention is that, since it is difficult to calculate mutual information (MI) or effective SINR from channel measurements for the non-linear joint detection, the quality of soft values is utilized. The quality of the soft values may then be used to reflect the performance of the demodulation that is used in practice.

It is to be noted that, in the description, capacity C is used interchangeably with the term mutual information MI, both terms conventionally being used for reflecting the possible data throughput of a channel.

For LTE as well as other communication standards, reference signals or pilot signals exist in the time-frequency grid for which a user equipment reports link adaptation information. This fact is used in the present invention in order to decode such reference signals, look at the soft values of the reference signal decoding and then make decisions regarding use of modulation coding scheme.

In a LTE downlink (DL) signal, common reference signals (CRS) are transmitted over two antenna ports, using Quadrature Phase-Shift Keying (QPSK) modulation. The CRS for different antenna ports are transmitted on different resource elements. In accordance with embodiments of the invention, the channel quality for given precoder matrices is estimated. For the MMSE-based SINR estimator, this can be done by calculating the SINR from all combinations of the estimated channel and precoder matrices. The invention provides, in different aspects, methods for performing this also for the joint demodulation.

Figure 2:
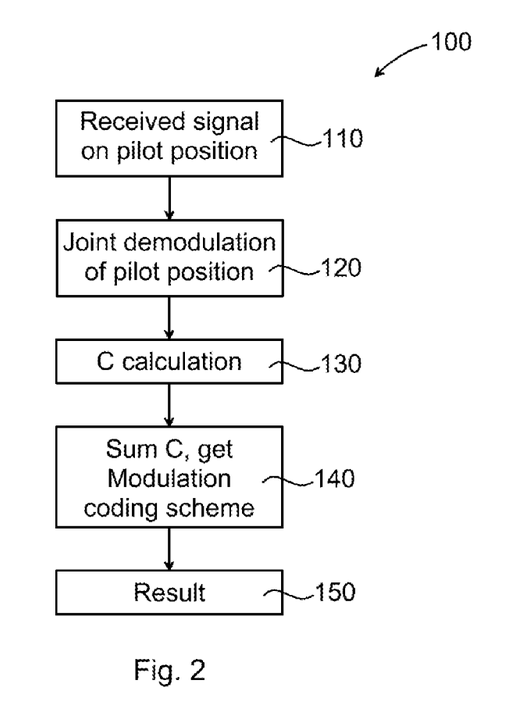
FIG. 2 is a flow chart of a method implemented in a user equipment.

FIG. 2 is a flow chart of a method implemented in and performed by the user equipment 2. The method 100 comprises receiving 110 a reference signal, in the following also denoted pilot signal x on pilot positions. In the MIMO enabled communication system, and as mentioned above, the CRS for different antenna ports are transmitted on different resource elements. On the two antenna ports thus, x is transmitted, where $x=[x0]^T$ or $x=[0x]^T$, with x being drawn from a QPSK constellation. That is, only one CRS antenna port is active at a time, while the other CRS antenna port remains silent. The fact that only one of the CRS antenna ports transmits, prevent a joint demodulation to be directly applied on the received CRS resource elements.

The pilot signals are not precoded, but in accordance with the invention, a virtual pilot signal $x_v$ may be seen as being introduced and used. In particular, the virtual pilot signal $x_v$ could be seen as being input to a precoder having precoder matrix W. The output from the precoder would then be $x=W x_v$.

Now using LTE for exemplifying this, the precoder W can, in the 2×2 MIMO configuration case, be equal to $$\begin{bmatrix} 0.5 & 0.5 \\ 0.5 & -0.5 \end{bmatrix} \text{ or } \begin{bmatrix} 0.5 & 0.5 \\ 0.5j & -0.5j \end{bmatrix}$$

as defined in LTE specification 36.211.

Next, in step 120, joint demodulation is performed on the reference signals, with more than one possible constellation point on all streams, using a precoder matrix W.

The above step 120 can be seen as "decoding", or rather obtaining, the virtual pilot signal $x_v$. The virtual pilot signal $x_v$ is thus demodulated. That is, the virtual pilot signal $x_v$ is demodulated giving the signal as it would have looked like before the decoder (had the pilot signal been precoded). Operations can be performed beforehand to calculate the nominal points. The ideal QPSK constellation points of $x_v$ would be placed so that $x_v=W^{-1} x$. Calculating this gives the possible $x_v$ constellation points as a QPSK constellation. This is true for the data streams received at both antennas $5_1$, $5_2$ of the receiver (i.e. the user equipment 2). Thus, there are no zero constellation points that would need special attention.

Referring still to FIG. 2, the step 120 may comprise derotation of the precoder matrix W and a transformation. The ideal constellation points as calculated are transformed such that they match up on a constellation point (examples given in FIGS. 3a, 3b, 3c, 3d). For example, they may be scaled with a factor or translated with an affine transformation. It is noted that different transformations may be used, e.g. depending on type of constellation points to be examined (e.g. constellation points representing QPSK, 16-QAM or 64-QAM etc.).

The received signal of the CRS resource elements is, after the $W^{-1}$ calculations (multiplications) and possible transformation used as input for the joint demodulation 120. The output from the joint detection 120 comprises, for the 64-QAM case, a vector of six soft values. These soft values correspond to different bits, with different quality, and the soft values will therefore likely have different absolute values, i.e., the bits have different reliability.

Next, a soft value-to-capacity C (or equivalently MI) conversion is performed at 130. For the C calculations known methods may be used.

Based on the soft value, a bit error probability $P_b$ may be calculated in accordance with:

$$P_b = \frac{1}{(1+e^{|\lambda|})}, \quad (1)$$

wherein λ are soft values. Equation (1) thus gives the bit error probability $P_b$ based on the obtained soft values.

The capacity C may then be calculated for a Binary Symmetric Channel (BSC) as:

$$C=1+P_b \log_2 P_b +(1-P_b)\log_2(1-P_b) \quad (2)$$

Equation (2) thus gives the capacity of a binary symmetric channel based on the bit error probability $P_b$ as given by equation (1).

For all bits i=0, 1, . . . , 5, an individual capacity $C_i$ is obtained. In box 140 of the flow chart of the method 100, all these $C_i$ are summed, giving an estimate of the channel capacity.

In various embodiments, this sum may be further processed by calculating e.g. efficiency, thus taking coding imperfections into account, in a similar way as may be done for the MMSE case.

Finally, at box 150, a modulation coding scheme (MCS) can be chosen based for this combination of precoder (precoder matrices) and channel-noise environment.

Figure 3A:
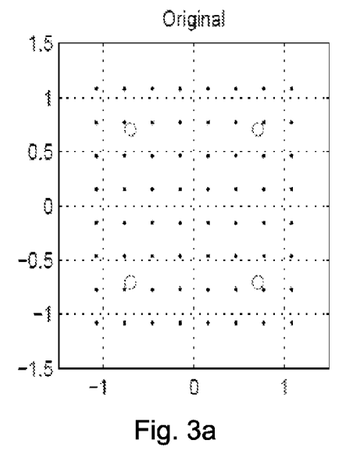
FIGS. 3a, 3b, 3c and 3d illustrate different transformation examples.
Figure 3B:
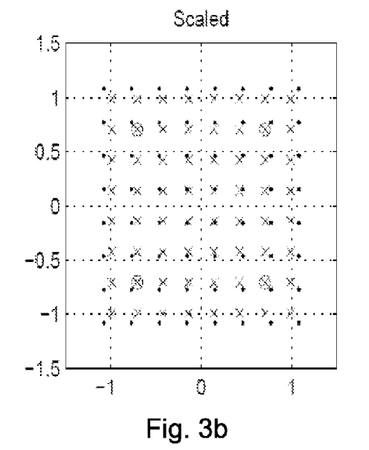

FIGS. 3a, 3b, 3c, 3d illustrate various examples of the transformation 130 of the possible constellation points so as to match the constellation points obtained in the demodulation process. In particular FIG. 3a illustrates, at the four circles, four different constellation points. The 64 dots illustrate joint demodulation points (e.g. 64-QAM constellation points). The constellation points and the four constellation points can be made to match in different ways. FIG. 3b illustrates the 64-QAM constellation is scaled such that the points match as desired. Alternatively, this may be done on the signal, i.e. such that the four circles are moved outwards.

As a further alternative, a match may be created without scaling. The constellation points could be moved without changing their internal distances. In FIG. 3d, the constellation points are moved such that there is a match in one of the circles (the upper right-hand circle). The three remaining circles then do not match, but this can be handled by using the knowledge about what has been transmitted on the reference signal, thus knowing which quadrant is the correct one.

Figure 3C:
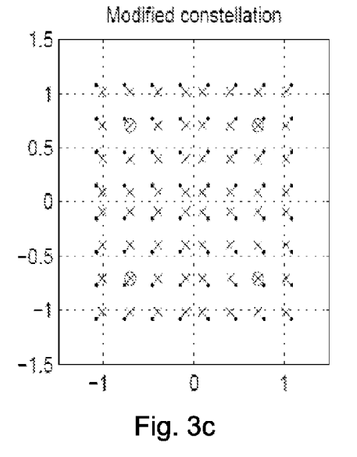
Figure 3D:
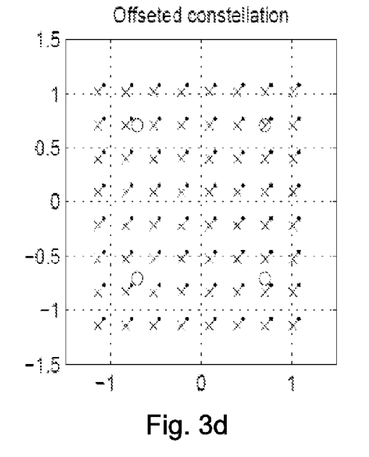

As a still further alternative, illustrated in FIG. 3c, the four quadrants may be moved separately. The distance between the middle constellation points is changed, but the distance to the nearest neighbor is unchanged.

Figure 4:
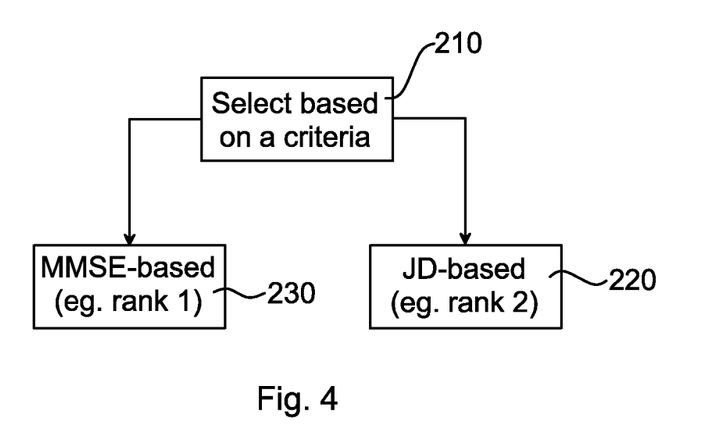
FIG. 4 is a flow chart of an implementation aspect of the methods.

FIG. 4 illustrates an embodiment, wherein the above method is, for some reason, not always performed, e.g. not for all cases. For example, the MMSE-based estimation always needs to operate, since the joint demodulation for rank 1 is the same as the MMSE demodulator. Thus, the MMSE-based estimate is the correct one (same as) to use for the joint demodulation with rank 1. For a rank 2 case, one alternative is to let the method as described in relation to FIG. 2 operate all the time. Yet another alternative is to, based on complexity and performance decisions, let the method 100 operate only on some rank 2 cases, e.g. only for certain modulation orders.

Figure 5:
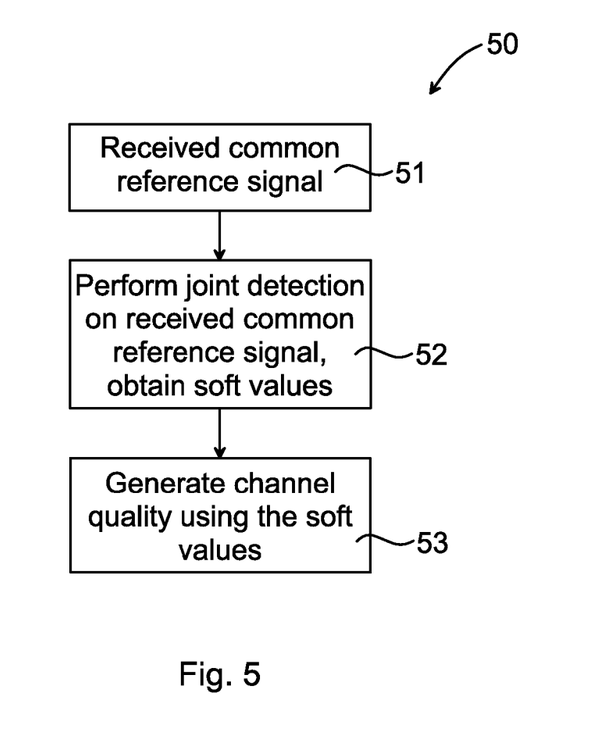
FIGS. 5 and 6 are flow charts of methods performed in a user equipment.

The above method may be implemented in a user equipment 2 as described with reference to FIG. 1 for estimating channel quality. That is, performed in a user equipment 2 adapted to operate in a multiple input multiple output (MIMO) mode in the communication system 1 comprising a base station node 3 that supports MIMO and serves the user equipment 2. FIG. 5 is a flow chart of such a method performed in the user equipment 2. In an embodiment the method 50 (refer and compare also with FIG. 2, method 100) comprises receiving 51 (compare 110 of FIG. 2), from the base station node 3, a reference signal. The reference signal may be a common reference signal, e.g. the cell-specific common reference signal as used in a communication system adopting LTE standards.

The method 50 further comprises performing 52 (compare 120 of FIG. 2) joint demodulation of the reference signal, thereby obtaining soft values. Instead of just estimating received reference signals, the reference signals are also demodulated as if they were precoded, thereby enabling the determination of channel quality also on other resource blocks than the ones the user equipment 2 is scheduled in.

In particular, the method 50 further comprises generating 53 (130, 140, 150) the desired channel quality estimation using the soft values.

In an embodiment, the performing 52 (120) of joint demodulation of the reference signal comprises using a precoder matrix W. That is, joint demodulation is performed using the precoder matrix W, but operating on the received reference signals (which are not precoded). As joint demodulation on data signals also utilizes the precoder matrix W in the demodulation process, this matrix is already available. This step could be differently stated as joint demodulation with precoder on reference signals having no precoder. Joint demodulation of reference signals, with more than one possible constellation point on a respective data stream, can thus be made.

In an embodiment, the method comprises, before the joint demodulation, obtaining a virtual precoded reference signal $x_v$, giving possible $x_v$ constellation points. The obtaining of a virtual precoded reference signal $x_v$ may, in an embodiment, be performed by derotating a precoder matrix W.

The method 50 (100) may also comprise transforming the possible $x_v$ constellation points for adaptation to a used modulation scheme such that the possible $x_v$ constellation points match the corresponding modulation scheme.

Figure 6:
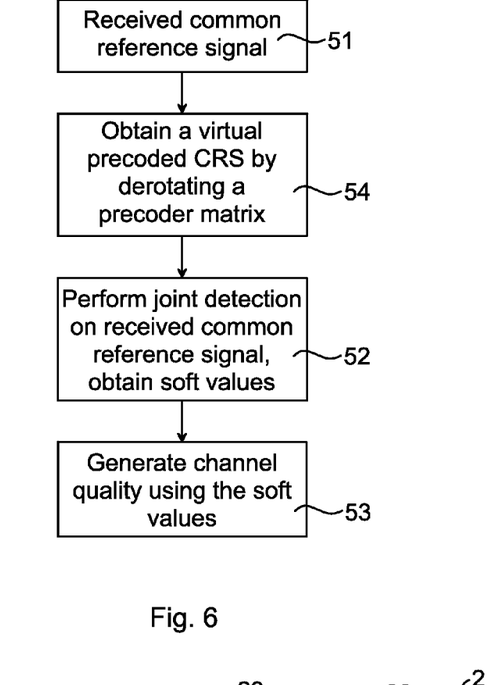

With reference to FIG. 6, in an embodiment of the method 50, a step 54 is performed of obtaining a virtual precoded reference signal $x_v$, for example by derotating a precoder matrix W, giving possible $x_v$ constellation points. That is, the virtual precoded reference signal $x_v$ is created, e.g. by derotating with the proper precoder matrix W. Such step is then performed before, or as part of, the joint demodulation 52.

Further, in this embodiment, transformation, e.g. scaling may also be performed, wherein the possible $x_v$ constellation points are adapted to a used modulation scheme such that the possible $x_v$ constellation points match the corresponding modulation scheme. The transformation is then performed before, or as part of, the joint demodulation 52.

In an embodiment, the generating 53 (compare 130, 140, 150 of FIG. 2) of the channel quality comprises converting 56 (130) the soft values to capacity information C, the capacity information C providing a measure on the channel quality.

In an embodiment, the soft values are used for calculating a bit error probability $P_b$. The bit error probability $P_b$ may for example be calculated by the equation (1) as described earlier.

In an embodiment, the bit error probability $P_b$ is used for calculating the capacity information C. The capacity information C may be calculated for a Binary Symmetric Channel (BSC) by equation (2) as described earlier.

Based on the above, an embodiment of the method 50 (100) comprises obtaining (not illustrated, but compare block 130 of FIG. 2) for all bits i=0, 1, . . . , n corresponding to a soft value, an individual capacity information $C_i$, and summing (not illustrated, but compare block 140 of FIG. 2) the individual capacity information $C_i$, giving an estimate of the channel capacity.

In an embodiment, the method 50 comprises, following the receiving 51 (compare 110 of FIG. 2) of a reference signal:
determining a rank;
performing, for rank equaling 2 or higher, joint demodulation 52 (120) of the reference signal, thereby obtaining soft values;
generating 53 (130, 140, 150) the channel quality using the soft values, and
performing, for a rank equaling 1, estimation for generating the channel quality using a minimum mean square error, MMSE, receiver.

For this embodiment, reference is also made to FIG. 4 and related text. It may for example be determined that the most gains of using joint demodulation are obtained for a certain code rate or modulation and coding scheme, and that MMSE based demodulation, involving lower complexity calculations, could be used for code rates below a certain threshold and still provide comparable quality of channel estimations as if using joint demodulation. Thus, in other embodiments, the joint demodulation as described may e.g. be used for some, but not all, rank 2 cases. For rank 1, the channel quality is always estimated assuming a MMSE receiver (since joint demodulation for rank 1 is equal to MMSE demodulation, as mentioned earlier).

Figure 7:
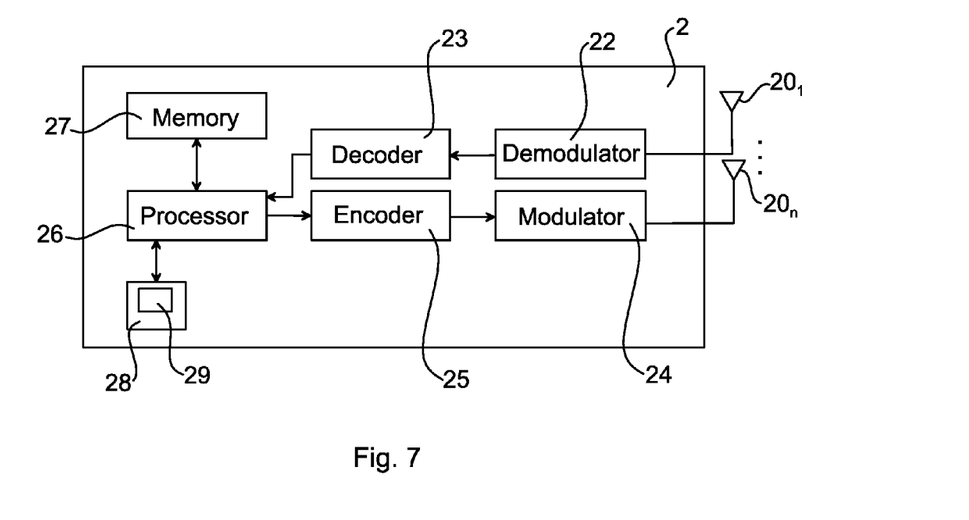
FIG. 7 illustrates schematically a user equipment comprising functional blocks for implementing embodiments of methods of the invention.

FIG. 7 illustrates schematically a user equipment 2 comprising functional blocks for implementing embodiments of methods as described. The user equipment 2 comprises n antennas $20_1, \ldots, 20_n$ for reception of signals from the base station node 3 and for transmission of signals to the base station node 3.

The signals received by the antennas are input to receiver front end circuitry (not illustrated) for subsequent demodulation. The user equipment 2 thus further comprises a demodulator 22, which performs derotation, transformation and joint detection. In an embodiment thus, the demodulator 22 is configured to perform the functions as described at blocks 120, 130 and 140 in FIG. 2. The demodulator 22 generates and outputs soft values based on the modulation type used.

The generated soft values are output to a decoder 23. The user equipment 2 thus comprises a decoder 23 receiving the soft values from the demodulator 22. The decoder 23 may output bit values based on the soft values to a processor 26.

The user equipment 2 thus comprises a processor 26, which may be configured to perform the steps of the methods as described. The processor 26 may e.g. be configured to determine the capacity as described earlier with reference to FIG. 2, blocks 150, 160, 170.

For sake of completeness, a transmit chain is also illustrated. The user equipment 2 typically also comprises an encoder 25 receiving input from the processor 26 and outputting encoded data to a modulator 24, which in turn outputs a modulated data to be sent by transmit antennas for transmission to the base station node 3. It is noted that a user equipment typically performs further operations that could be implemented by further functional blocks, than those illustrated in FIG. 7. Examples of such further functional blocks comprise transmitter and receiver front end circuitry, signal generation module, antenna selector module etc.

It is noted that the functions described in relation to e.g. FIG. 2 may be performed by any other circuitry, hardware or software or combinations thereof, than the above described modules.

The invention thus also encompasses a computer program 29 for the user equipment 2 for estimating channel quality. The computer program 29 comprises computer program code which, when run on the user equipment 2, or particularly run on the processor 26 thereof, causes the user equipment 2 to:
receive, from the base station node 3, a reference signal;
perform joint demodulation of the reference signal, thereby obtaining soft values, and
generate the channel quality using the soft values.

The reception of reference signals is enabled by means of receiving antennas and related circuitry, the processor 26 thereby receiving suitably processed reference signal data.

The processor 26 may for example comprise general purpose microprocessors, central processing unit (CPU), digital signal processor (DSP), instruction set processors and/or related chips sets and/or special purpose microprocessors, such as ASICs (application specific integrated circuits). The processor 26 may also comprise board memory for caching purposes. The processor 26 is capable of executing software instructions stored in a computer program product 28 e.g. in the form of a memory.

The invention further encompasses such a computer program product 28 comprising a computer program 29 as described above and a computer readable means on which the computer program 29 is stored. For example, the computer program product 28 may be a flash memory, a RAM (Random-access memory), ROM (Read-Only memory) or an EEPROM (Electrically Erasable Programmable ROM), or any combination of read and write memory (RAM) and read only memory (ROM), an optical disc, such as a CD (compact disc) or a DVD (digital versatile disc) or a Blu-Ray disc. The memory may also comprise persistent storage, which, for example, can be any single one or combination of magnetic memory, optical memory, or solid state memory.

The described methods utilize known modulation format (e.g. QPSK) of the transmitted signals and use a joint detection in order to generate soft values and used for improving channel quality indicator (CQI) reporting. In contrast to known methods, which are based on soft values using the data signal and which can thus only report quality of resource blocks that the user equipment is scheduled in, the present invention enables soft value use on pilot signals enabling the reporting of any resource block, not only the ones that the user equipment is scheduled in.

The invention claimed is:

1. A method performed in a user equipment for estimating channel quality, the user equipment being adapted to operate in a multiple input multiple output (MIMO) mode in a communication system comprising a base station node supporting MIMO and serving the user equipment, the method comprising:
   receiving, from the base station node, a non-precoded reference signal;
   generating a virtual precoded reference signal for a joint demodulation by multiplying the inverse of a precoder matrix W with the non-precoded reference signal; determining a rank;
   performing, for said rank equaling 2 or higher, joint demodulation of the virtual precoded reference signal, thereby obtaining soft values;
   generating the channel quality using the soft values; and
   performing, for said rank equaling 1, estimation for generating the channel quality using a minimum mean square error, MMSE, receiver.

2. The method of claim 1, wherein the generating of the channel quality comprises converting the soft values to capacity information C, the capacity information C providing a measure on the channel quality.

3. The method of claim 1, wherein the soft values are used for calculating a bit error probability $P_b$.

4. The method of claim 3, wherein the bit error probability $P_b$ is calculated by:

$$P_b = \frac{1}{(1+e^{|\lambda|})},$$

wherein $\lambda$ is soft value.

5. The method of claim 4, wherein the capacity information C is calculated for a Binary Symmetric Channel by:

$$C=1+P_b \log_2 P_b+(1-P_b)\log_2(1-P_b)$$

6. The method of claim 5, further comprising:
   obtaining for all bits i=0, 1, . . . , n corresponding to a soft value, an individual capacity information $C_i$, and
   summing the individual capacity information $C_i$, giving an estimate of the channel capacity.

7. A user equipment for estimating channel quality, the user equipment being adapted to operate in a multiple input multiple output (MIMO) mode in a communication system comprising a base station node supporting MIMO and serving the user equipment, the user equipment being configured to:
   receive, from the base station node, a non-precoded reference signal;
   generate a virtual precoded reference signal for a joint demodulation by multiplying the inverse of a precoder matrix W with the non-precoded reference signal;
   determine a rank;
   perform, for said rank equaling 2 or higher, joint demodulation of the virtual precoded reference signal, thereby obtaining soft values;
   generate the channel quality using the soft values; and
   perform, for said rank equaling 1, estimation for generating the channel quality using a minimum mean square error, MMSE, receiver.

8. The user equipment of claim 7, wherein the user equipment is configured to generate the channel quality by converting the soft values to capacity information C, the capacity information C providing a measure on the channel quality.

9. The user equipment of claim 7, wherein the user equipment is configured to use the soft values for calculating a bit error probability $P_b$.

10. A non-transitory computer-readable medium storing computer program code for a user equipment for estimating channel quality, the user equipment being adapted to operate in a multiple input multiple output (MIMO) mode in a communication system comprising a base station node supporting MIMO and serving the user equipment, the computer program code which, when executed by the user equipment, causes the user equipment to:
   receive, from the base station node, a non-precoded reference signal;
   generate a virtual precoded reference signal for a joint demodulation by multiplying the inverse of a precoder matrix W with the non-precoded reference signal;
   determine a rank;
   perform, for said rank equaling 2 or higher, joint demodulation of the virtual precoded reference signal, thereby obtaining soft values;
   generate the channel quality using the soft values; and
   perform, for said rank equaling 1, estimation for generating the channel quality using a minimum mean square error MMSE receiver.

* * * * *